(12) United States Patent
Kim et al.

(10) Patent No.: US 8,011,004 B2
(45) Date of Patent: Aug. 30, 2011

(54) APPARATUS AND METHOD FOR VPN COMMUNICATION IN SOCKET-LEVEL

(75) Inventors: Hyo Won Kim, Gyeonggi-do (KR); Soo Hyeon Kim, Daejeon (KR); Sun Kang, Daejeon (KR); Tae Joo Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 666 days.

(21) Appl. No.: 12/106,427

(22) Filed: Apr. 21, 2008

(65) Prior Publication Data

US 2009/0328194 A1 Dec. 31, 2009

(30) Foreign Application Priority Data

Nov. 21, 2007 (KR) ........................ 10-2007-0118986

(51) Int. Cl.
*G06F 17/00* (2006.01)

(52) U.S. Cl. ....................................................... 726/15

(58) Field of Classification Search .................... 726/15, 726/11

See application file for complete search history.

(56) References Cited

U.S. PATENT DOCUMENTS

2006/0174336 A1* 8/2006 Chen ............................... 726/11

FOREIGN PATENT DOCUMENTS

| KR | 1020000059445 A | 10/2000 |
|---|---|---|
| KR | 1020030054102 | 7/2003 |
| KR | 1020050050257 A | 5/2005 |
| KR | 1020050058625 A | 6/2005 |
| KR | 1020050060314 | 6/2005 |
| KR | 1020050112912 | 12/2005 |
| KR | 1020060040001 A | 5/2006 |

* cited by examiner

*Primary Examiner* — Ellen Tran
(74) *Attorney, Agent, or Firm* — Ladas & Parry LLP

(57) ABSTRACT

Provided is an apparatus and method for virtual private network (VPN) communication in a socket level that can be applied in an Internet Protocol version 4(IPv4)/IPv6 complex network, and can process data in a socket level to make a VPN communication apparatus available in many applications requiring more security, as well as a web application, wherein the data is transmitted to and received from any one of the internal device and the external device.

14 Claims, 5 Drawing Sheets

FIG. 3

| 310 | 320 | 330 | 340 | 350 | 360 | 370 | 380 | 390 |
|---|---|---|---|---|---|---|---|---|
| Index | Client/Server | IP | Port | External FD | Internal FD | Flag | Shared-key life time | Security-related info |
|  |  |  |  |  |  |  |  |  |
|  |  |  |  |  |  |  |  |  |
|  | ... |  |  | ... |  |  | ... |  |
|  |  |  |  |  |  |  |  |  |

| 391 | 392 |
|---|---|
| Internal network IP | Key exchange port |
|  |  |

APPARATUS AND METHOD FOR VPN COMMUNICATION IN SOCKET-LEVEL

CROSS-REFERENCE TO RELATED APPLICATION

This application claims priority to and the benefit of Korean Patent Application No. 2007-118986, filed Nov. 21, 2007, the disclosure of which is incorporated herein by reference in its entirety.

BACKGROUND

1. Field of the Invention

The present invention relates to a virtual private network (VPN) communication apparatus and method, and more particularly, to an apparatus and method for VPN communication in a socket level that is applicable in an Internet Protocol version 4 (IPv4)/IPv6 complex network.

2. Discussion of Related Art

An Internet Protocol Security Protocol (IPSec) is a security protocol that can be applied to a virtual private network (VPN) communication apparatus. Since the IPSec provides a stable and permanent basis for the security of network layers, the IPSec may be applied in a fire wall, a VPN, and the like. The IPSec may cover not only a standard cryptographic algorithm, but also a new algorithm. The IPSec is essentially provided by an Internet Protocol version 6 (IPv6) protocol, which is called a next generation Internet protocol. However, the VPN communication apparatus using IPSec technology cannot be applied in the mixed IPv4/IPv6 network, since it processes data in a network layer but has no conversion technology between IPv4 and IPv6.

Security Sockets Layer (SSL) technology, which is currently in the spotlight, is a security protocol that provides web security. The SSL technology was developed to provide security and reliability for communications between two applications. However, since the VPN communication apparatus using the SSL technology only covers fixed standard cryptographic algorithms, it may not be used in many applications requiring more security and safety. Also, since the VPN communication apparatus is implemented as software in a client-side, it may frequently conflict with various types of applications.

SUMMARY OF THE INVENTION

The present invention is directed to an apparatus and method for virtual private network (VPN) communication in a socket level that can be applied in an Internet Protocol version 4 (IPv4)/IPv6 complex network, and can process data in a socket level to make a VPN communication apparatus available in many applications requiring more security, as well as a web application.

One aspect of the present invention provides an apparatus for VPN communication in a socket level, including: a VPN database for storing connection information of an internal device and an external device and security-related information associated with the connection information; a packet analyzing module for analyzing a packet received from the internal device or the external device, obtaining connection information of the device, and storing the obtained connection information in the VPN database; a key exchange engine for performing a key sharing process with the device, generating the security-related information associated with the connection information, and storing the generated security-related information in the VPN database; and a socket data processing engine for encoding or decoding data in the socket level based on the security-related information stored in the VPN database, wherein the data is transmitted to and received from the internal device or the external device.

Here, the apparatus may further include a policy information database for storing policy information including a user authentication method. The key exchange engine may generate the security-related information based on the policy information.

Also, the key exchange engine may perform the key sharing process when a key exchange packet is received via a predetermined key exchange port.

Also, the socket data processing engine may include: a decoding unit for decoding data received via the external network interface, based on the security-related information stored in the VPN database; an encoding unit for encoding data received via the internal network interface, based on the security-related information stored in the VPN database; and a transmitter for transmitting the decoded data via the internal network interface and transmitting the encoded data via the external network interface.

Another aspect of the present invention provides a method for VPN communication in a socket level, including: analyzing a packet received from an internal device or an external device, obtaining connection information of the device, and storing the obtained connection information in a VPN database; performing a key sharing process with the device, generating the security-related information associated with the connection information, and storing the generated security-related information in the VPN database; encoding and decoding data in the socket level based on the security-related information stored in the VPN database, wherein the data is transmitted to and received from the internal device and the external device; and transmitting the encoded data to the external device, or transmitting the decoded data to the internal device using the connection information stored in the VPN database.

Here, the generating and storing of the security-related information may include: receiving a packet via a key exchange port stored in the VPN database; determining whether the received packet is a key exchange packet; and when the received packet is the key exchange packet, performing a key sharing routine, generating security-related information, and storing the generated security-related information in the VPN database.

Also, the encoding and decoding of data in the socket level based on the security-related information stored in the VPN database may include: detecting an input/output change in at least one socket; analyzing socket file descriptor information of the detected socket based on connection information stored in the VPN database, and determining whether the connection of the device is initial connection; when the connection of the device is the initial connection, allowing a connection request based on the connection information stored in the VPN database; receiving a packet from the device; determining whether the packet is received via an external network interface or an internal network interface; when the packet is received via the external network interface, decoding the received packet using the security-related information stored in the VPN database; and when the packet is received via the internal network interface, encoding the received packet using the security-related information.

BRIEF DESCRIPTION OF THE DRAWINGS

The above and other features and advantages of the present invention will become more apparent to those of ordinary skill in the art by describing in detail preferred embodiments thereof with reference to the attached drawings in which:

FIG. 3 illustrates detailed items of a VPN database according to an exemplary embodiment of the present invention;

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. Therefore, the following embodiments are described in order for this disclosure to be complete and enabling to those of ordinary skill in the art.

Figure 1:
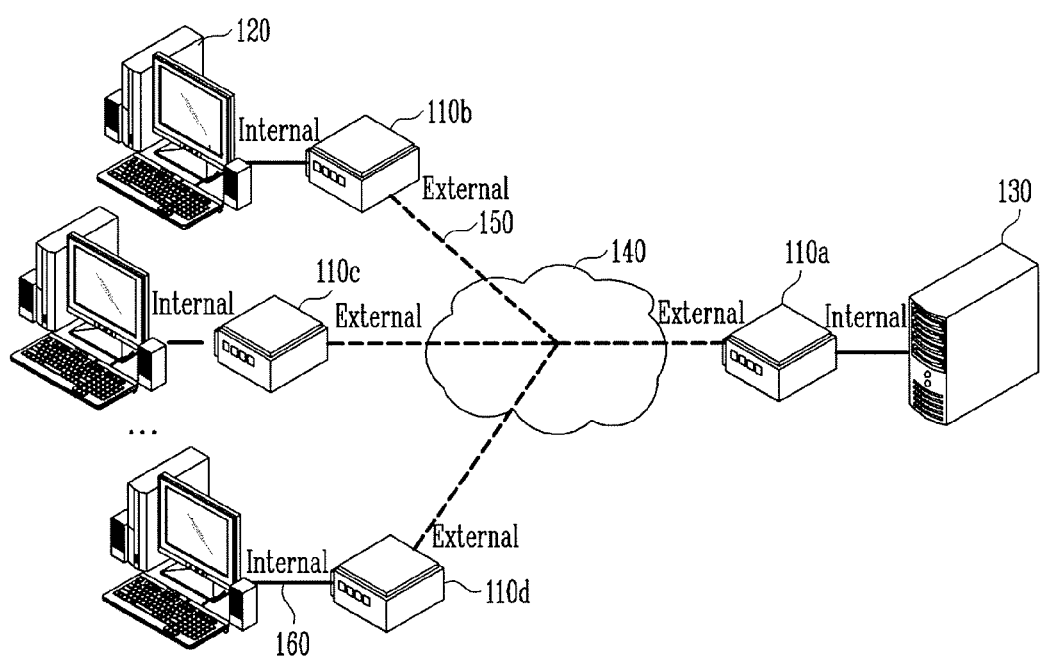
FIG. 1 illustrates the configuration of a virtual private network (VPN) adopting a VPN communication apparatus according to the present invention.

FIG. 1 illustrates the configuration of a virtual private network (VPN) adopting a VPN communication apparatus according to the present invention. As shown in FIG. 1, when communications between a client 120 and a content server 130, or between clients 120 are made via an Internet Protocol version 4 (IPv4)/IPv6 complex network 140, a section 150 indicated by dotted lines corresponds to a security communication section within the VPN. Another section 160 indicated by solid lines corresponds to a plain text communication section. In the above network configuration, VPN communication apparatuses 110a, 110b, 110c, and 110d according to an aspect of the present invention are installed in a front end of the clients 120 and the content server 130, and function to protect communication data transmitted and received between the clients 120 and the content server 130.

Also, although not illustrated in FIG. 1, a connection module may be installed in the client 120 to embody a connection protocol between the client and the VPN communication apparatus. The connection module may transfer, to the VPN communication apparatuses 110a, 110b, 110c, and 110d, IP information of a server that the client 120 desires to connect to.

Figure 2:
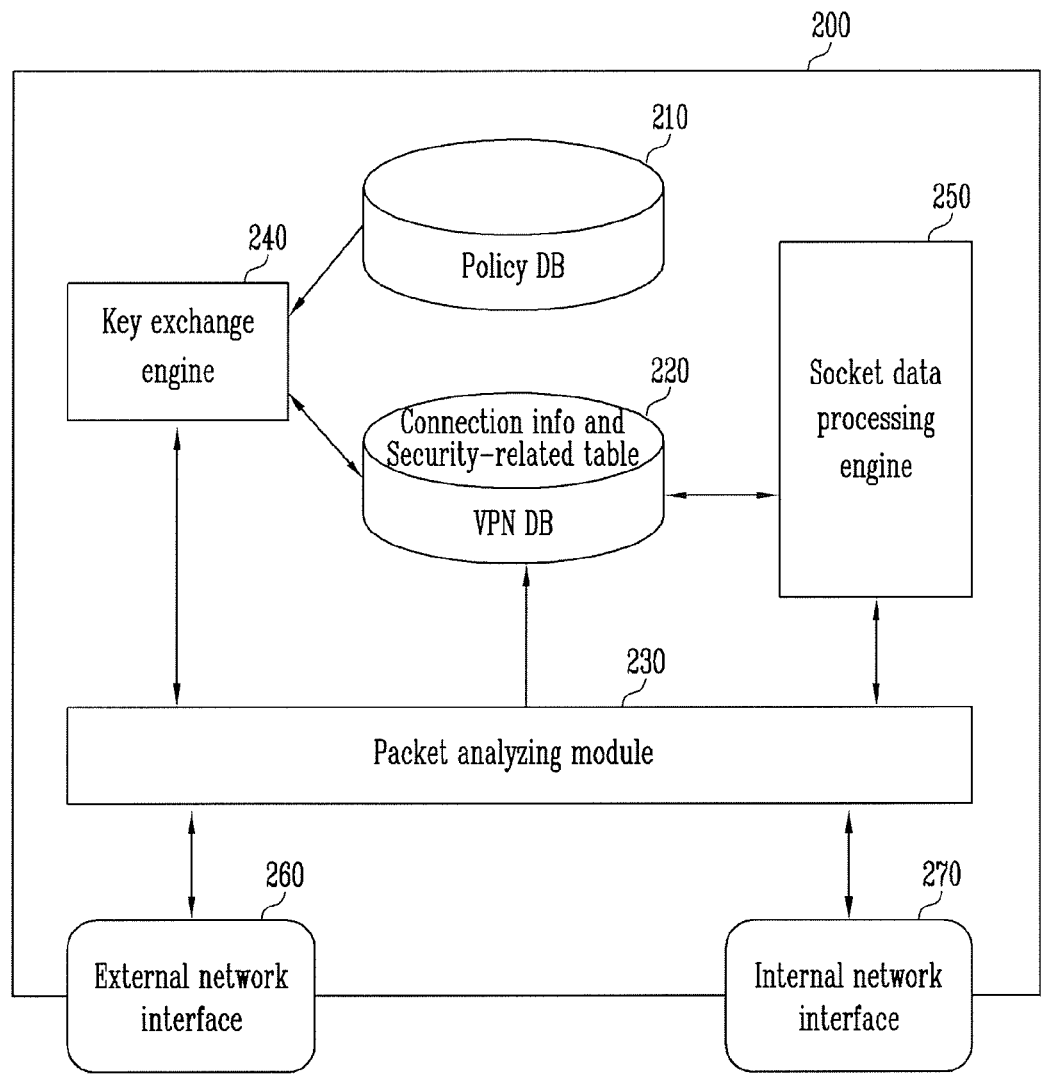
FIG. 2 is a block diagram illustrating the configuration of a VPN communication apparatus according to an exemplary embodiment of the present invention.

FIG. 2 is a block diagram illustrating the configuration of a VPN communication apparatus 200 according to an exemplary embodiment of the present invention. As shown in FIG. 2, the VPN communication apparatus 200 includes a policy database 210, a VPN database 220, a packet analyzing module 230, a key exchange engine 240, a socket data processing engine 250, an external network interface 260, and an internal network interface 270.

The policy database 210 stores policy information that is set in relation to a user authentication processing method, and is referred to in a user authentication process by the key exchange engine 240. According to an aspect of the present invention, the policy database 210 may include settings about the number of retrials according to a key exchange failure, determination of a malicious attack depending on the number of times of a key exchange attempt and failure, discard of a packet associated with a set IP, bypass, application of encryption, and the like.

The VPN database 220 stores security-related information and connection information generated by the packet analyzing module 230, the key exchange engine 240, and the socket data processing engine 250. The connection information and the security-related information are associated each other. Accordingly, both the connection information and the security-related information may be searched using an index item that is allocated to a connection session. Also, the VPN database 220 stores IP addresses of a server and a client connected to the internal network interface 270, and, therefore, the VPN database 220 provides the IP address, when the socket data processing engine 250 connects to the internal network.

FIG. 3 illustrates detailed items of the VPN database 220 according to an exemplary embodiment of the present invention. As shown in FIG. 3, the VPN database 220 stores items such as an index 310 for classifying connection information and security-related information, client/server information 320 for classifying operation of client/server, external client connection IP information and port information 330 and 340, external and internal client (server) connection socket file descriptors 350 and 360, a flag 370 for identifying user authentication, a shared-key life time 380, security-related information 390 shared through a key exchange process, an internal client/server IP address 391 connected via an internal network interface, a key exchange port 392, and the like. The items are only an example and thus the present invention is not limited thereto.

Referring again to FIG. 2, the packet analyzing module 230 analyzes a received packet, obtain connection information, and store the connection information in the VPN database 220. The connection information includes IP and port information of a device that is connected via the external network interface 260 or the internal network interface 270. Here, connection information of the previously-connected device is not stored in duplicate. According to an aspect of the present invention, the packet analyzing module 230 may be implemented using a netfilter framework. The netfilter framework may perform a packet filtering function through a kernel system and also may analyze IP and port information about a client that is connected via the external network interface 260 or the internal network interface 270.

The key exchange engine 240 analyzes a key exchange packet that is received from the connected device via a predetermined key exchange port, to generate security-related information based on policy information stored in the policy database 210, and to store the generated security-related information in the VPN database 220. An operation of the key exchange engine 240 will be described in detail later with reference to FIG. 4.

The socket data processing engine 250 performs multiple-input multiple-output (MIMO) and encodes/decodes a transmitted/received packet in a socket level based on the VPN database 220. According to an aspect of the present invention, the socket data processing engine 250 includes: a decoding unit (not shown) for decoding a packet received via the external network interface 260, based on the security-related information stored in the VPN database 220; an encoding unit (not shown) for encoding a packet received via the internal network interface 270, based on the security-related information; and a transmitter (not shown) for transmitting the decoded data via the internal network interface 270 and transmitting the encoded data via the external network interface 260.

An operation of the socket data processing engine 250 will be described later in detail with reference to FIG. 5.

The external network interface 260 transmits and receives data between the VPN communication apparatus 200 and an external device, for example, a client or a server, which are connected via the VPN 140. The internal network interface 270 transmits and receives data between the VPN communication apparatus 200 and an internal device, for example, a client or a server, which the VPN communication apparatus desires to protect.

Figure 4:
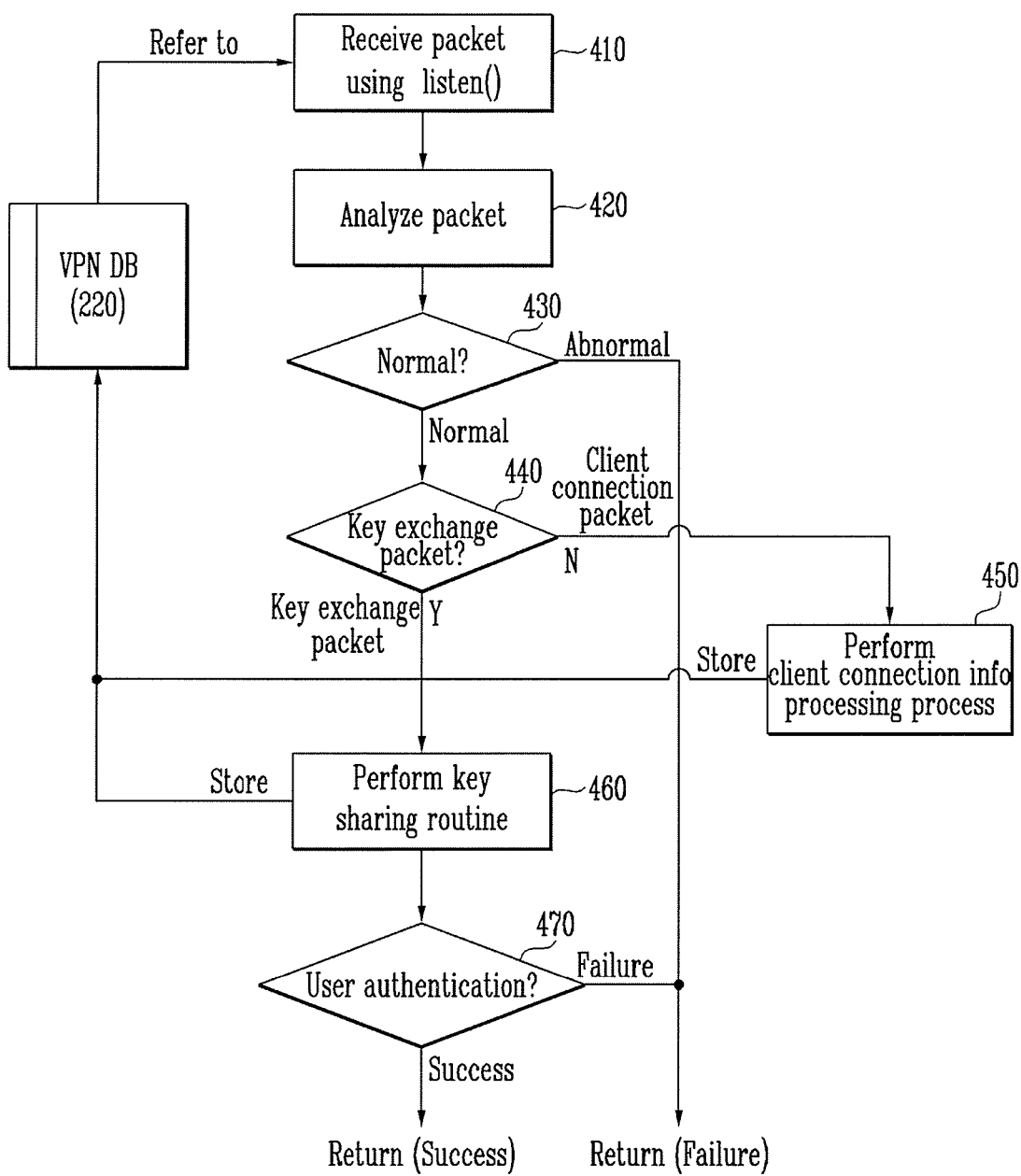
FIG. 4 is a flowchart illustrating an operation being implemented by a key exchange engine according to an exemplary embodiment of the present invention.

FIG. 4 is a flowchart illustrating an operation performed by the key exchange engine 240 according to an exemplary embodiment of the present invention.

The key exchange engine 240 receives a packet via a predetermined key exchange port by referring to key exchange port information stored in the VPN database 220 (step 410). According to an aspect of the present invention, the packet is received using a listen( ) function.

The key exchange engine 240 analyzes the received packet (step 420), and determines whether the packet is normal (step 430).

When the received packet is abnormal, the key exchange engine 240 returns a failure value. Conversely, when the received packet is normal, the key exchange engine 240 determines whether the packet is a frame key exchange packet or a client connection packet (step 440).

When the received packet is the client connection packet, the key exchange engine 240 processes the client connection information to obtain IP information of a server that a corresponding client wishes to connect to and stores it in the VPN database 220 (step 450).

Conversely, when the received packet is the key exchange packet, the key exchange engine 240 performs a key sharing routine (step 460). The key sharing routine generates security-related information based on policy information stored in the policy database 210 through the key sharing process. The security-related information includes information about a user authentication key, an encryption key, a decryption key, and an integrity verification key. The generated security-related information is stored in the VPN database 220.

Also, the key exchange engine 240 performs user authentication using the user authentication key that is generated through the key sharing process (step 470), and returns a failure or a success result value depending on the authentication result.

Figure 5:
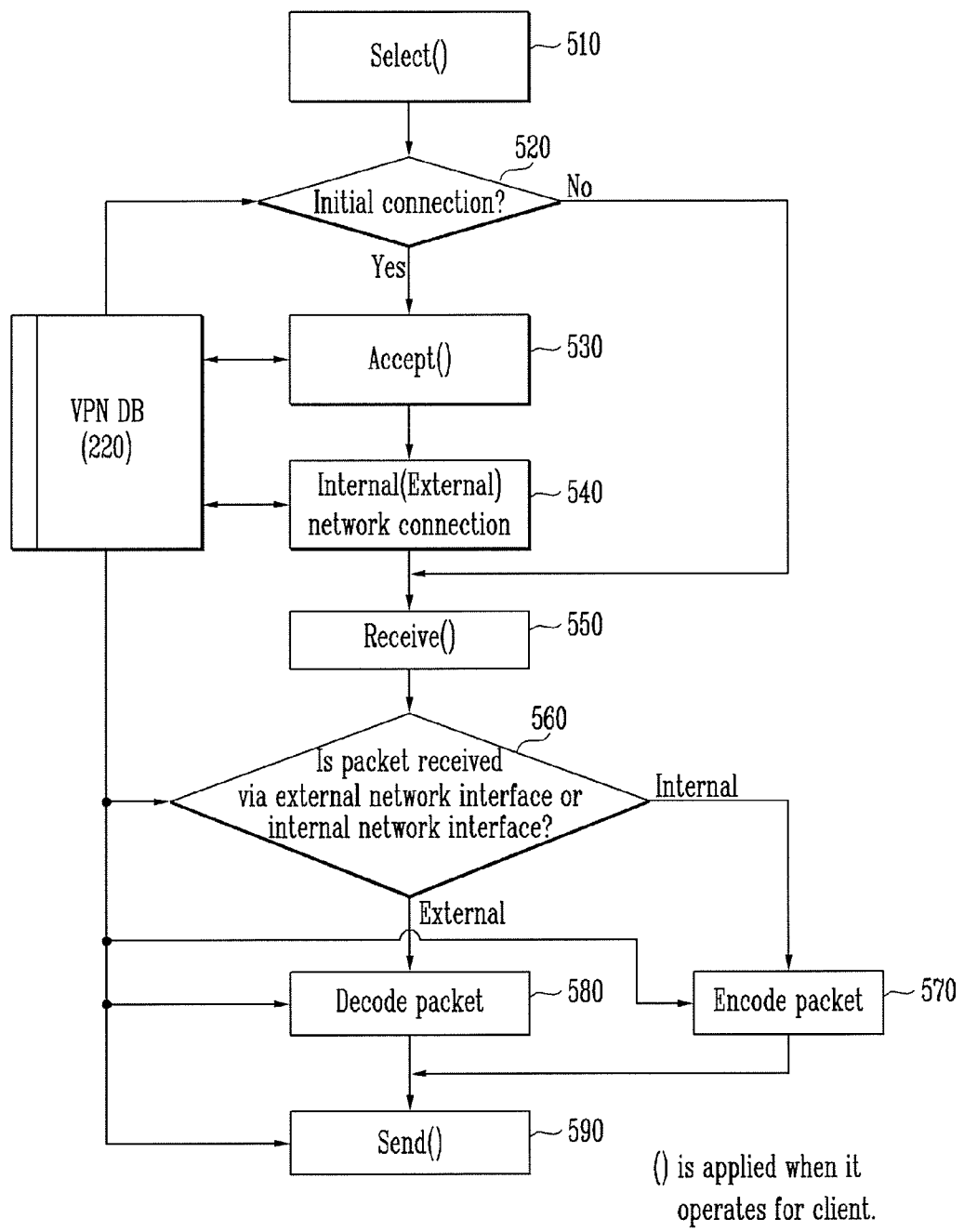
FIG. 5 is a flowchart illustrating an operation being implemented by a socket data processing engine according to an exemplary embodiment of the present invention.

FIG. 5 is a flowchart illustrating an operation performed by the socket data processing engine 250 according to an exemplary embodiment of the present invention. As described above, the socket data processing engine 250 performs MIMO using a select( ) function supporting an asynchronous mode. In step 510, the socket data processing engine 250 detects an input/output change in any one of at least one socket using the select( ) function. In step 520, the socket data processing engine 250 analyzes socket file descriptor information of the detected socket based on connection information stored in the VPN database 220 to determine whether it is an initial connection.

In step 530, when it is the initial connection, the socket data processing engine 250 obtains port information and allows a connection request based on the connection information stored in the VPN database 220. According to an aspect of the present invention, step 530 is performed using an accepts( ) function. The accept( ) function is a function that allows the connection request coming into a corresponding socket.

In step 540, the socket data processing engine 250 obtains connection information of an internal or external device from the VPN database 220, connects to the device via an internal or external network interface, and updates the connection information of the VPN database 220 using a connection socket file descriptor.

In step 550, the socket data processing engine 250 receives a packet (data) using a receive( ) function by using the socket file descriptor received from the select( ) function.

In step 560, the socket data processing engine 250 determines whether the packet received through the receive( ) function is received via the external network interface or the internal network interface. When the packet is received via the external network interface, the socket data processing engine 250 decodes the received packet using the security-related information stored in the VPN database 220 (step 580), and transmits the decoded packet via the internal network interface (step 590). According to an aspect of the present invention, data may be transmitted using a send( ) function.

Conversely, when the packet is received via the internal network interface, the socket data processing engine 250 encodes the received packet using the security-related information (step 570), and transmits the encoded packet via the external network interface using the connection information stored in the VPN database 220 (step 590).

As described above, according to the present invention, it is possible to provide a VPN communication apparatus that may operate in a client and a server as a single external type device. Also, the VPN communication apparatus may transmit and receive data in a socket level. Accordingly, regardless of a network configuration such as an IPv4 network, an IPv6 network, and an IPv4/IPv6 complex network, the VPN communication apparatus may be applicable. Also, unlike a Security Sockets Layer (SSL) VPN using a web application and a standard cryptographic algorithm, the VPN communication apparatus has a structure capable of applying various types of applications and a new cryptographic algorithm.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for virtual private network (VPN) communication in a socket level, the apparatus comprising:
    a VPN database for storing connection information of an internal device and an external device and security-related information associated with the connection information;
    a packet analyzing module for analyzing a packet received from the internal device or the external device, obtaining connection information of the device, and storing the obtained connection information in the VPN database;
    a key exchange engine for performing a key sharing process with the device, generating the security-related information associated with the connection information, and storing the generated security-related information in the VPN database; and
    a socket data processing engine for encoding or decoding data in the socket level based on the security-related information stored in the VPN database, wherein the data is transmitted to and received from the internal device or the external device,
    wherein the encoding and decoding of data in the socket-level based on the security-related information stored in the VPN database comprises:
    detecting an input/output change in at least one socket;
    analyzing socket file descriptor information of the detected socket based on the connection information stored in the VPN database, and determining whether the connection of device is initial connection;

when the connection of the device is the initial connection, allowing a connection request based on the connection information stored in the VPN database;
receiving a packet from the device;
determining whether the packet is received via an external network interface or an internal network interface;
when the packet is received via the external network interface, decoding the received packet using the security-related information stored in the VPN database; and
when the packet is received via the internal network interface, encoding the received packet using the security-related information.

2. The apparatus of claim 1, further comprising:
a policy information database for storing policy information including a user authentication method,
wherein the key exchange engine generates the security-related information based on the policy information.

3. The apparatus of claim 1, wherein the key exchange engine performs the key sharing process when a key exchange packet is received via a predetermined key exchange port.

4. The apparatus of claim 1, further comprising:
an external network interface for transmitting and receiving data with the external device that is connected via a VPN; and
an internal network interface for transmitting and receiving data with the internal device that the socket-level VPN communication apparatus desires to protect.

5. The apparatus of claim 4, wherein the connection information comprises Internet Protocol (IP) and port information of the external device and the internal device that are connected via the external network interface and the internal network device, respectively, and socket file descriptor information.

6. The apparatus of claim 1, wherein the security-related information comprises information about a user authentication key, an encryption key, a decryption key, and an integrity verification key.

7. The apparatus of claim 1, wherein the key exchange engine further comprises:
a storing unit for receiving a client connection packet from the internal device, obtaining from the client connection packet IP information of a server that the internal device desires to connect to, and storing the IP information in the VPN database.

8. The apparatus of claim 4, wherein the socket data processing engine comprises:
a decoding unit for decoding data received via the external network interface, based on the security-related information stored in the VPN database;
an encoding unit for encoding data received via the internal network interface, based on the security-related information stored in the VPN database; and
a transmitter for transmitting the decoded data via the internal network interface and transmitting the encoded data via the external network interface.

9. The apparatus of claim 1, wherein the socket data processing engine performs multiple-input multiple-output using a select( )function.

10. The apparatus of claim 1, wherein the socket-level VPN communication apparatus is an external type device that is installed in a front end of a client or a server desired for protection.

11. A method for VPN communication in a socket level, comprising:
analyzing a packet received from an internal device or an external device, obtaining connection information of the device, and storing the obtained connection information in a VPN database;
performing a key sharing process with the device, generating the security-related information associated with the connection information, and storing the generated security-related information in the VPN database;
encoding and decoding data in the socket level based on the security-related information stored in the VPN database, wherein the data is transmitted to and received from the internal device and the external device,
wherein the encoding and decoding of data in the socket-level based on the security-related information stored in the VPN database comprises:
detecting an input/output change in at least one socket;
analyzing socket file descriptor information of the detected socket based on the connection information stored in the VPN database, and determining whether the connection of device is initial connection;
when the connection of the device is the initial connection, allowing a connection request based on the connection information stored in the VPN database;
receiving a packet from the device;
determining whether the packet is received via an external network interface or an internal network interface;
when the packet is received via the external network interface, decoding the received packet using the security-related information stored in the VPN database; and
when the packet is received via the internal network interface, encoding the received packet using the security-related information; and
transmitting the encoded data to the external device, or transmitting the decoded data to the internal device using the connection information stored in the VPN database.

12. The method of claim 11, wherein the generating and storing of the security-related information comprises:
receiving a packet via a key exchange port stored in the VPN database;
determining whether the received packet is a key exchange packet; and
when the received packet is the key exchange packet, performing a key sharing routine, generating security-related information, and storing the generated security-related information in the VPN database.

13. The method of claim 12, wherein the key sharing routine generates the security-related information based on policy information stored in a policy database, and the security-related information comprises information about a user authentication key, an encryption key, a decryption key, and an integrity verification key.

14. The method of claim 12, further comprising:
when the received packet is a client connection packet received from the internal device, generating IP information of a server that a client desires to connect to, and storing the IP information in the VPN database.

* * * * *